United States Patent
Lee

(10) Patent No.: US 7,463,445 B2
(45) Date of Patent: Dec. 9, 2008

(54) METHOD OF CONTROLLING TRACK SEEK IN HDD AND A RECORDING MEDIUM THEREFOR

(75) Inventor: Jung-ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 412 days.

(21) Appl. No.: 11/324,488

(22) Filed: Jan. 4, 2006

(65) Prior Publication Data

US 2006/0279870 A1    Dec. 14, 2006

(30) Foreign Application Priority Data

May 26, 2005    (KR) .................... 10-2005-0044484

(51) Int. Cl.
    *G11B 5/55*    (2006.01)
(52) U.S. Cl. .................................. 360/78.14
(58) Field of Classification Search ........... None
    See application file for complete search history.

(56) References Cited

U.S. PATENT DOCUMENTS

| 5,661,617 | A |   | 8/1997 | Suzuki |            |
|-----------|---|---|--------|--------|------------|
| 5,859,742 | A | * | 1/1999 | Takaishi | ............ 360/78.01 |
| 5,956,201 | A |   | 9/1999 | Pham et al. |         |
| 6,515,820 | B1 |  | 2/2003 | Burton et al. |        |
| 6,819,519 | B2 | * | 11/2004 | Takaishi et al. | ........ 360/78.04 |
| 6,848,019 | B1 | * | 1/2005 | Mobley et al. | ........ 360/78.01 |
| 6,865,051 | B2 | * | 3/2005 | Takaishi | ............ 360/78.04 |

(Continued)

FOREIGN PATENT DOCUMENTS

EP    0 774 754    5/1997

(Continued)

OTHER PUBLICATIONS

Extended European Search Report issued in corresponding European Patent Application No. 06009143.6 on Feb. 5, 2008.

*Primary Examiner*—Hoa T. Nguyen
*Assistant Examiner*—James L Habermehl
(74) *Attorney, Agent, or Firm*—Staas & Halsey LLP

(57) ABSTRACT

Provided is a hard disc drive controlling method, and more particularly, a method of controlling track seek in a hard disc drive (HDD) provided against a shift between discs, and a computer readable recording medium having embodied thereon a computer program for the method. The method of controlling track seek in a HDD, including disc switching, includes: head switching to a head corresponding to a disc having a target track; calculating track seek length by comparing the previous target track address and the current target track address; determining whether or not the track seek length is shorter than the limit seek length set by considering a shift of a disc; if the track seek length is shorter than the limit seek length, reading the track address of a track on which the head is put on the switched disc, and by referring to the read track address and the target track address, determining track seek length and a seek profile thereof; and performing track seek according to the determined seek profile. According to the track seek control method of the invention, even when there is a shift between discs, the shift is automatically reflected and compensated for when track seek is performed, such that stable track seek can be performed.

8 Claims, 8 Drawing Sheets

U.S. PATENT DOCUMENTS

2002/0167752 A1 11/2002 DuLaney et al.
2004/0049605 A1* 3/2004 Pollock et al. ............... 710/1

FOREIGN PATENT DOCUMENTS

| | | | |
|---|---|---|---|
| GB | 2 039 078 | | 7/1980 |
| JP | 2-297703 | | 12/1990 |
| JP | 04157681 A | * | 5/1992 |
| JP | 04205978 A | * | 7/1992 |
| JP | 9-180385 | | 7/1997 |
| JP | 2004-5998 | | 1/2004 |
| KR | 1998-063213 | | 10/1998 |

* cited by examiner

METHOD OF CONTROLLING TRACK SEEK IN HDD AND A RECORDING MEDIUM THEREFOR

CROSS-REFERENCE TO RELATED APPLICATION

This application claims the benefit of Korean Patent Application No. 10-2005-0044484, filed on May 26, 2005, in the Korean Intellectual Property Office, the disclosure of which is incorporated herein in its entirety by reference.

BACKGROUND OF THE INVENTION

1. Field of the Invention

The present invention relates to a hard disc drive controlling method and, more particularly, to a method of controlling track seek in a hard disc drive (HDD) provided against a shift between discs, and a computer readable recording medium having embodied thereon a computer program for the method.

2. Description of the Related Art

Generally an HDD includes a plurality of heads capable of writing and reading information by sensing a magnetic field on a disc and magnetizing a part. Information is stored on tracks each having a concentric circle shape. Each track has a unique disc number and track number (address), and among a plurality of discs, tracks having an identical track address are referred to as a cylinder. Accordingly, each track is also defined by a cylinder address.

Each head (transducer) is integrated into the inside of a slider, which is typically incorporated into a head gimbal assembly (HGA). Each HGA is attached to an actuator arm. The actuator arm has a voice coil located close to a magnetic assembly defining a voice coil motor together. An HDD typically includes a driving circuit and a controller providing a current exciting the voice coil motor. The excited voice coil motor rotates the actuator arm such that heads are moved across the surface of the disc(s).

When information is written or read, the HDD can perform a track seek operation to move a head from one cylinder to another cylinder. By the track seek operation, the voice coil motor is excited so that the head is moved from one cylinder on the disc surface to another cylinder. The controller controls a current to be provided to the voice coil motor so that the head can be moved accurately to a target cylinder and the center of a track.

FIG. 1 illustrates the structure of the conventional track seek controlling apparatus using a sine wave profile. A track seek controller 100 includes a sine wave trajectory generator 102, a notch filter, a VCM driver 126, a hard disc assembly (HAD) 128, and an estimator 104.

The track seek controller 100 shown in FIG. 1 performs a track seek control routine to move a head to a target track which is apart from the first track by track seek length $K_{SK}$.

The sine wave trajectory generator 102 generates a sine wave profile, that is, position y*(k), velocity v*(k), and acceleration a*(k) with respect to the sine wave acceleration trajectory, at each sampling cycle Ts.

In order to obtain sine function and cosine function values used to generate a sine wave acceleration trajectory, the values of sine function and cosine function are sampled in synchronization with sampling cycle Ts, and stored in a ROM table, such that the functions can be read in synchronization with sampling cycle Ts.

The ROM table stores a sine function and a cosine function at an initial sampling cycle in relation to several frequencies that are representative, that is, representative frequencies. The sine function and cosine function values of the initial cycle in relation to a frequency between representing frequencies are determined by interpolation. Here, a frequency corresponds to the track seek length. That is, if track seek length is given, the frequency of a sine wave is determined accordingly.

FIG. 2 illustrates a position trajectory (y), a velocity trajectory (v) and an acceleration trajectory (a) in the apparatus shown in FIG. 1. In FIG. 2, the time axis is normalized based on track seek time $T_{SK}$. That is, FIG. 2 shows an acceleration trajectory (a), a velocity trajectory (v) and a position trajectory (y) when given track seek time $T_{SK}$ is 1.

Referring to FIG. 2, it can be seen that track seek time $T_{SK}$ corresponds to one cycle of the acceleration trajectory (a) in the form of a sine wave. Also, it can be seen that, by controlling the motion of a head to have the acceleration trajectory (a), the head moves by track seek length $K_{SK}$ during seek time $T_{SK}$.

The estimator 104 outputs the estimated position y(k) and estimated velocity v(k) of the head by referring to the positions of the head at the previous samples (k−1, k−2, ...) and the current sample (k).

The position of a track, that is, the track number, can be identified through a gray code recorded in a sector area, and the head reads the gray code while moving on the disc. The gray code read through the head is provided to the estimator 104.

FIG. 3 illustrates discs arranged in an HDD. The HDD normally has two or more discs 32, 34, and 36, and the discs are fixed on a hub 38. The hub 38 is rotated by a spindle motor.

When the discs 32, 34, and 36 are assembled to the hub 38, it is preferable that mechanical twist occurs as little as possible.

After the HDD is assembled, a reference servo signal is recorded on one of the discs 32, 34 and 36. The disc on which the reference servo signal is recorded is referred to as a reference disc, while the others are referred to as blank discs.

After that, the reference servo signal recorded on the reference disc is copied to the others through a servo copy process.

As a result of precise servo copying, tracks (cylinder) on a vertical line have an identical track address.

However, if a mechanical twist between discs occurs by an external shock while the HDD is used under a user environment, or by its own deformation, tracks on a vertical line turn not to have an identical track address. This is referred to as a shift between discs.

FIG. 4 illustrates a case where a shift between discs occurs. Referring to FIG. 4, there is no shift between disc 2 and disc 1 whereas there is a shift between discs 2 and 1 and disc 0.

As the track density of an HDD increases, the influence of a disc shift becomes relatively bigger. Also, with the decreasing diameter of a disc, a disc shift by an assembly tolerance becomes relatively greater. Accordingly, an HDD with a smaller size and higher capacity has a higher probability that the seek operation becomes unstable or fails in the predetermined seek range.

FIG. 5 is a flowchart of the operations performed by the conventional track seek controlling method including disc switching.

First, head switching to a disc on which there is a target track is performed in operation S502.

By referring to the previous target track address and the target track address, track seek length and a seek profile thereof are determined in operation S504. Here, the previous target track address indicates the target track address of the previous track seek operation and is regarded as the address of the track in which the current head is placed in the current track seek operation.

According to the seek profile determined in operation S504, track seek is performed in operation S506.

Referring to FIG. 4, in the case of track seek between disc 1 and disc 2 where there is no shift, even if the conventional track seek controlling method is applied as shown in FIG. 5, it does not matter. More specifically, when track seek is performed from position A of disc 2 where the track address is #1000, to position C of disc 1 where the track address is #1060, the track seek length calculated in operation S504 and the actual track seek length are both 60 and identical. Accordingly, by moving the head according to a profile corresponding to the track seek length 60, the head can be accurately moved to position C.

However, when the conventional track seek controlling method as shown in FIG. 5 is applied to the track seek between disc 1 and disc 0 having a shift as shown in FIG. 4, a problem occurs. More specifically, when track seek is performed from position C of disc 1 where the track address is #1000, to position D of disc 0 where the track address is #1060, the track seek length calculated in operation S504 is 60, but the actual track seek length is just 10 by the disc shift. Accordingly, if the head is moved by a profile corresponding the track seek length of 60 calculated in operation S504, the head cannot be moved accurately to position D and in addition, seek failure or vibration occurs in the worst case.

FIG. 6 is a waveform diagram showing the result of a track seek between discs having a shift according to the conventional track seek controlling method.

Referring to FIG. 6, a waveform indicated by reference number 60 shows a sine waveform, a waveform indicated by reference number 62 shows a target current profile generated with respect to the seek length and time, and a waveform indicated by reference number 64 shows a final driving current of the voice coil motor provided to the voice coil motor by a servo control system. Referring to the voice coil motor driving current 64, it can be seen that a steep peak appears at the end of track seek.

This peak occurs as the estimator 104 shown in FIG. 2 reflects an error corresponding to the shift amount in the process of performing feed back control by referring to a track address read from the disc while the head is moved by a given profile 60.

This peak in the voice coil motor driving current 64 gives a sudden shock to the voice coil motor, and by this shock, vibration is generated, and in some cases, track seek fails. Accordingly, a track seek controlling method considering the shift of a disc is needed.

SUMMARY OF THE INVENTION

Additional aspects and/or advantages of the invention will be set forth in part in the description which follows and, in part, will be apparent from the description, or may be learned by practice of the invention.

The present invention provides a method of controlling track seek capable of stable track seek by considering a shift between discs in controlling track seek in an HDD.

The present invention also provides a computer readable recording medium having embodied thereon a computer program for executing the track seek controlling method.

The present invention also provides an HDD to which the track seek controlling method is applied.

According to an aspect of the present invention, there is provided a method of controlling track seek in a hard disc drive (HDD), including disc switching, including: head switching to a head corresponding to a disc having a target track; calculating track seek length by comparing the previous target track address and the current target track address; determining whether the track seek length is shorter than the limit seek length set by considering a shift of a disc; if the track seek length is shorter than the limit seek length, reading the track address of a track on which the head is put on the switched disc, and by referring to the read track address and the target track address, determining track seek length and a seek profile thereof; and performing track seek according to the determined seek profile.

The method may further include: if the track seek length is longer than the limit seek length, determining a seek profile corresponding to the track seek length; and according to the determined seek profile, performing track seek.

According to another aspect of the present invention, there is provided a computer readable recoding medium having embodied thereon a computer program for executing a method of controlling track seek in an HDD, including disc switching, wherein the method includes: head switching to a head corresponding to a disc having a target track; calculating track seek length by comparing the previous target track address and the current target track address; determining whether the track seek length is shorter than the limit seek length set by considering a shift of a disc; if the track seek length is shorter than the limit seek length, reading the track address of a track on which the head is put on the switched disc, and by referring to the read track address and the target track address, determining track seek length and a seek profile thereof; and performing track seek according to the determined seek profile.

According to still another aspect of the present invention, there is provided a hard disc drive (HDD) including: a disc storing predetermined information; a spindle motor rotating the disc; a head recording information on the disc and reading information from the disc; a voice coil motor (VCM) driver driving a voice coil motor (VCM) moving the head across the surface of the disc; and a controller generating a current driving the VCM so that the head is moved along a sine wave acceleration trajectory corresponding to the track seek length, wherein the controller head switches a head corresponding to a disc having a target track; calculates track seek length by comparing the previous target track address and the current target track address; determines whether or not the track seek length is shorter than the limit seek length set by considering a shift of a disc; if the track seek length is shorter than the limit seek length, reads the track address of a track on which the head is put on the switched disc, and by referring to the read track address and the target track address, determines track seek length and a seek profile thereof; and performs track seek according to the determined seek profile.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
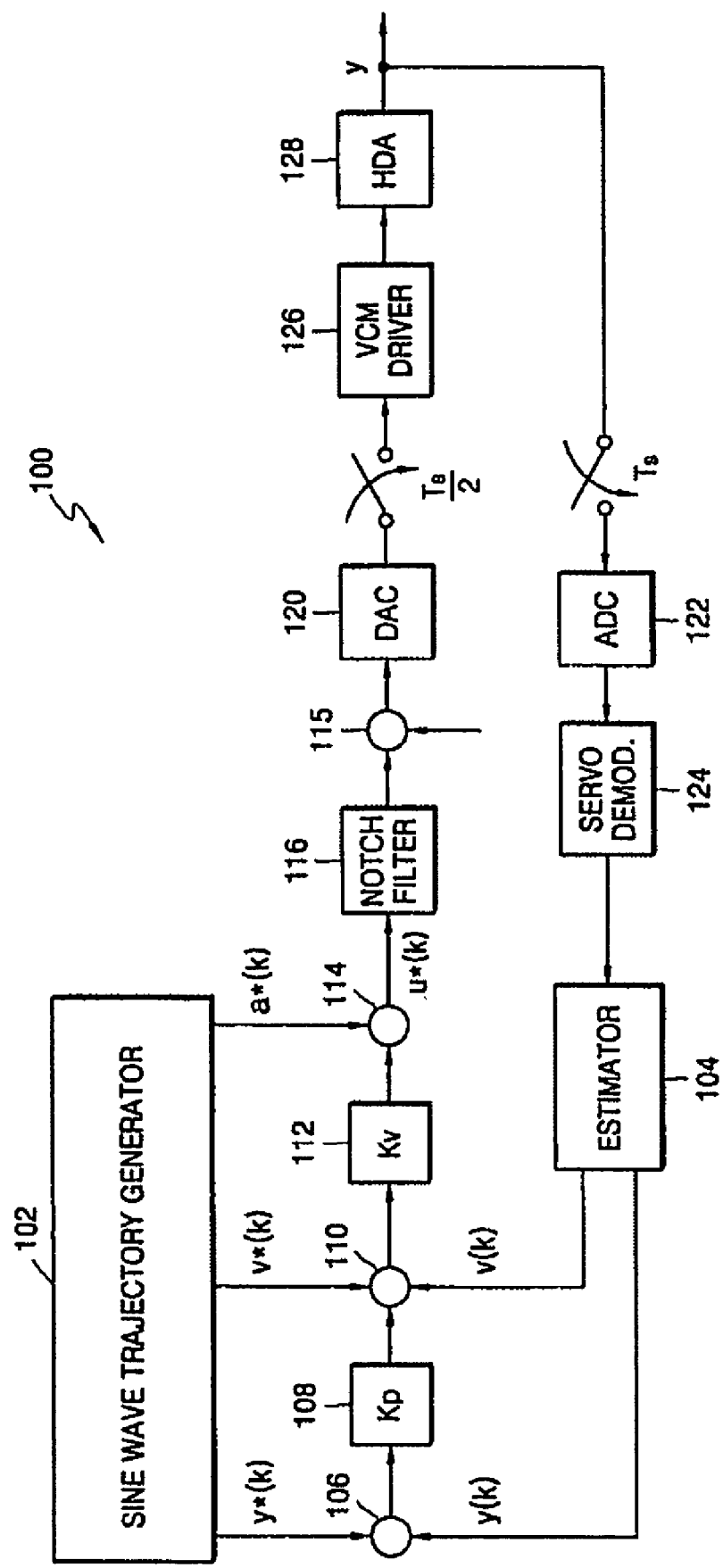
FIG. 1 illustrates the structure of the conventional track seek controlling apparatus using a sine wave profile.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 7:
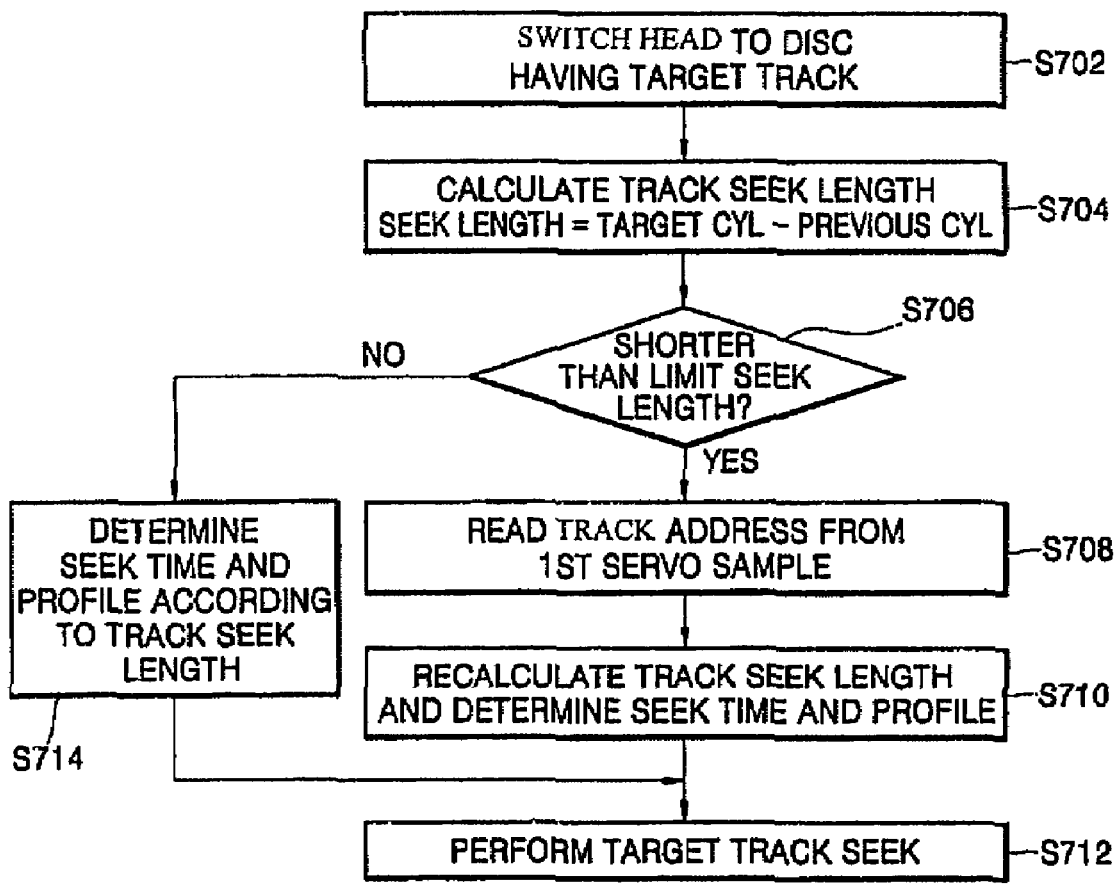
FIG. 7 is a flowchart of the operations performed by a preferred embodiment of a track seek controlling method including disc switching according to the present invention.

FIG. 7 is a flowchart of the operations performed by a preferred embodiment of a track seek controlling method including disc switching according to an embodiment of the present invention.

If track seek operation begins, head switching to a disc on which there is a target track is performed in operation S702.

By comparing the target track address in the previous seek operation with the target track address in the current seek operation, track seek length is calculated in operation S704.

It is determined whether the track seek length is shorter than the predetermined limit seek length set by considering a disc shift in operation S706.

In the assembling operation of an HDD, discs to be assembled to a hub are fixed as mechanically solidly as possible. Accordingly, even though a shift occurs in a user environment, it is very rare that the shift exceeds the predetermined error range. Accordingly, the predetermined limit seek length is set by considering a maximum shift amount that can occur, and is used as a reference to be applied to track seek according to the present invention. Here, the limit seek length may correspond with the maximum shift amount that can occur, or may be a little longer than that.

If it is determined that the track seek length is shorter than the limit seek length in operation S706, a track address is read from a first servo sample in operation S708.

Here, the first servo sample is the first information item among servo information items read through the head after the operation S706. However, it does not need to be the first servo sample, and it is important to read a track address as quickly as possible.

By referring to the read track address and the target address, track seek length is re-calculated in consideration of the shift of the disc, and seek time and seek profile according to the seek length are determined in operation S710.

According to the seek profile determined in operation S710, track seek is performed in operation S712.

Figure 2:
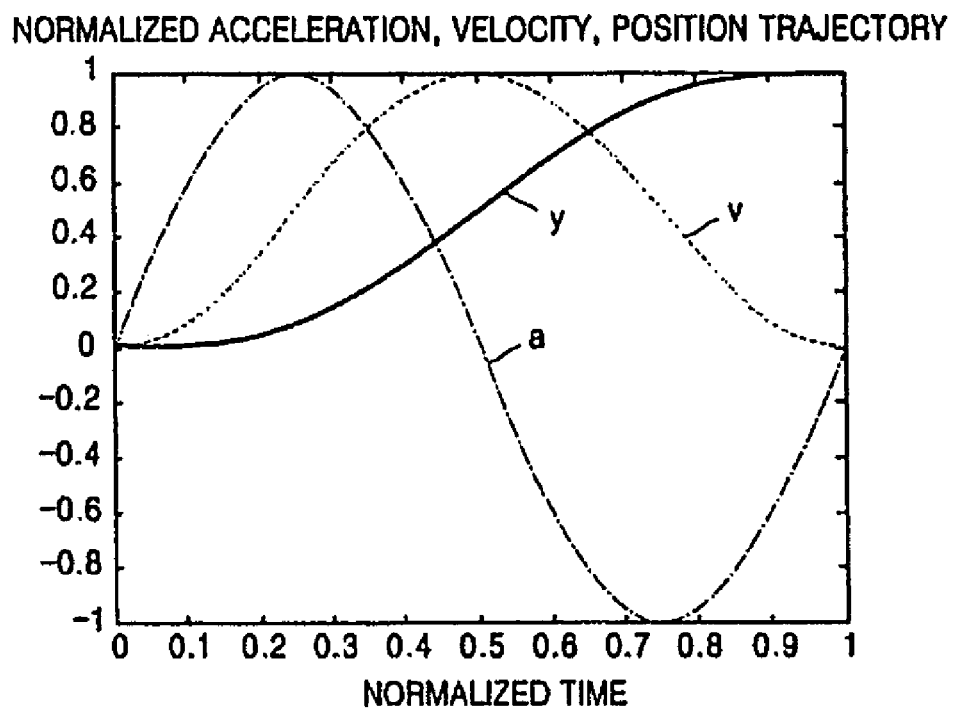
FIG. 2 illustrates a position trajectory (y), a velocity trajectory (v) and an acceleration trajectory (a) in the apparatus shown in FIG. 1.
Figure 3:
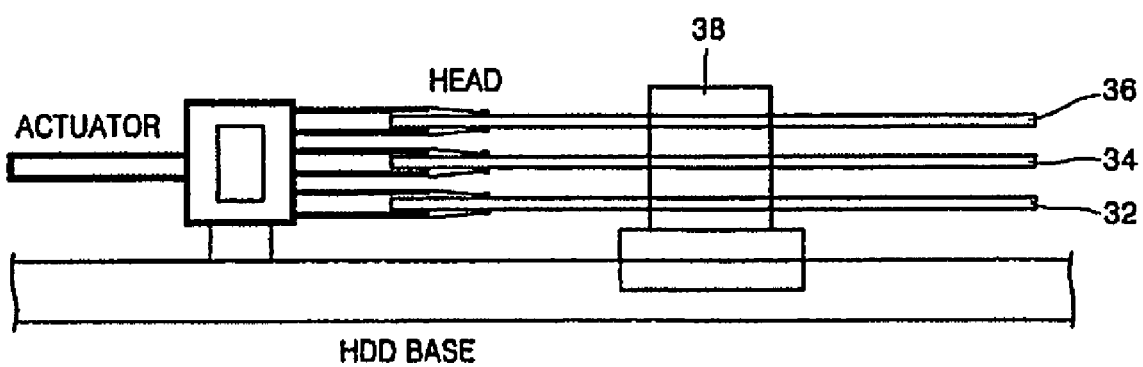
FIG. 3 illustrates discs arranged in a HDD.
Figure 6:
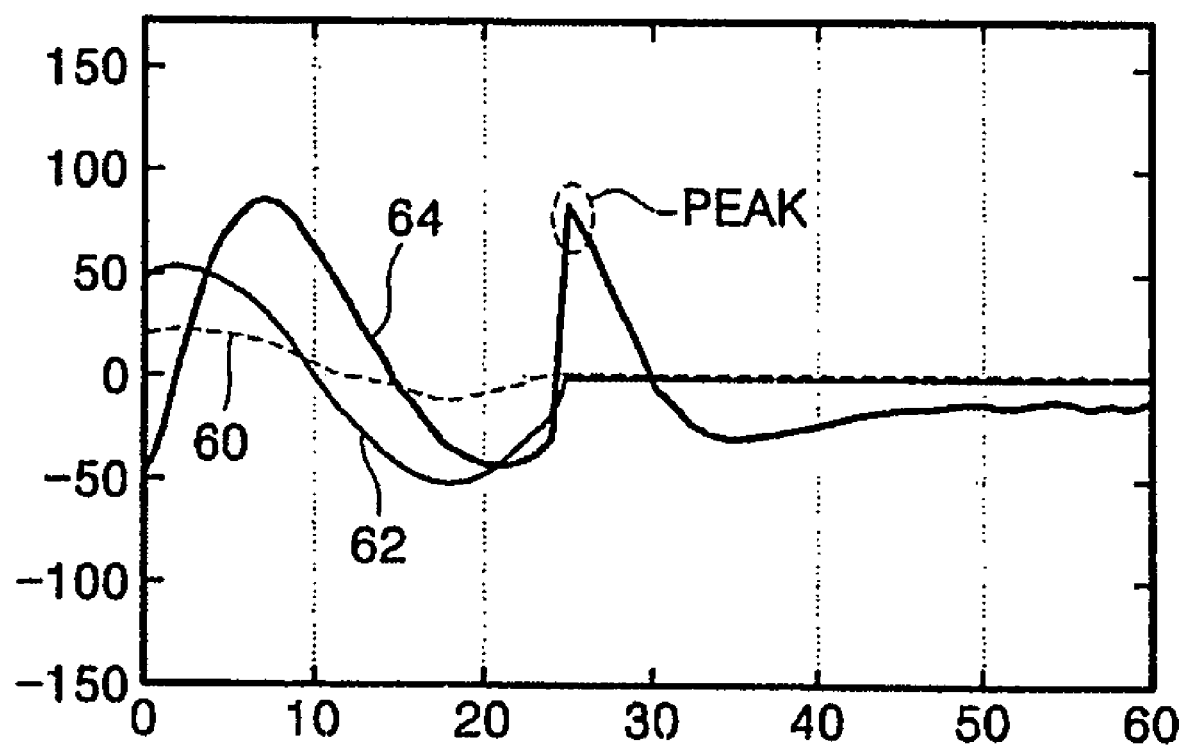
FIG. 6 is a waveform diagram showing the result of performing track seek in discs having a shift according to the conventional track seek controlling method.

If the track seek length is longer than the limit seek length in operation S710, operation S714 is performed and track seek is performed based on the seek profile determined in operation S702. If the track seek length is relatively longer than the limit seek length, even though the estimator 104 of FIG. 2 reflects the shift between discs during performing track seek, a sudden change such as a peak in the voice coil motor driving current 64 as shown in FIG. 6 does not occur.

In the track seek controlling method according to the present invention as shown in FIG. 7, it can be seen that the calculation of track seek length and head switching varies with respect to the track seek length.

Figure 4:
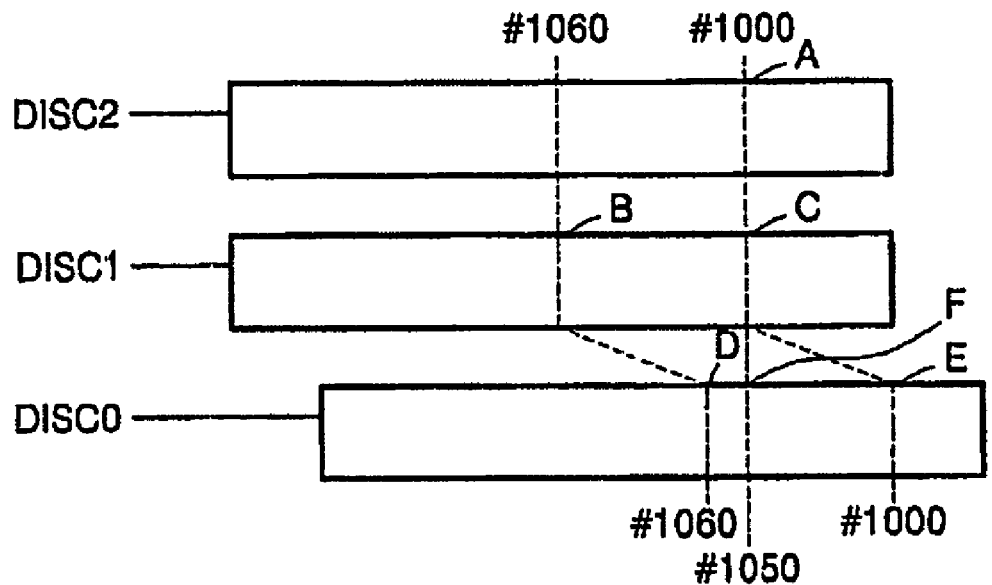
FIG. 4 illustrates a case where a shift between discs occurs.
Figure 5:
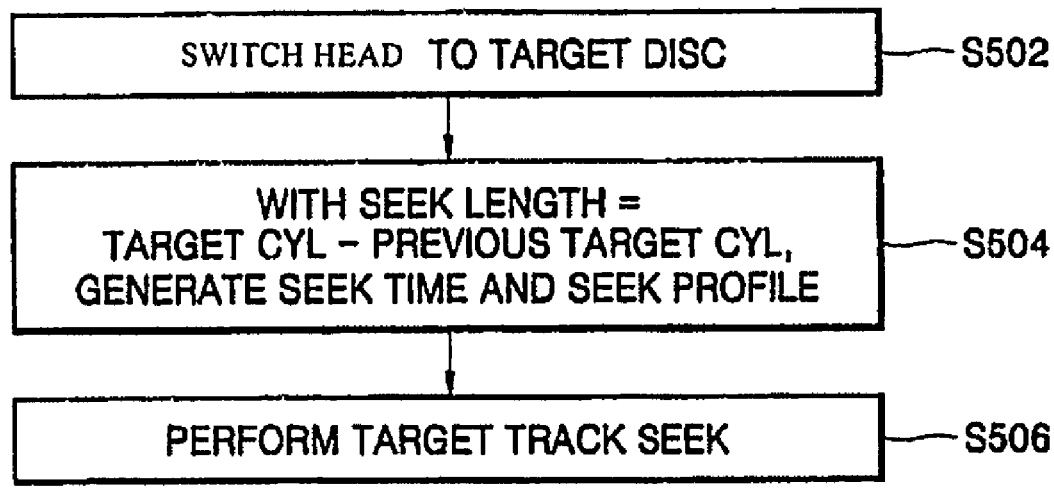
FIG. 5 is a flowchart of the operations performed by the conventional track seek controlling method including disc switching.

A track seek operation when track seek length is shorter than the limit seek length in the track seek controlling method according to the present invention as shown in FIG. 7 will now be explained with reference to FIG. 4.

First, the head is switched at position C of disc 1. As a result of the head switching the head is placed at position F. The track address (#1050) of position F is read, and by comparing it with the target address #1060, track seek length 10 is obtained. A seek profile corresponding to the obtained track seek length 10, and track seek is performed according to this profile.

Figure 8:
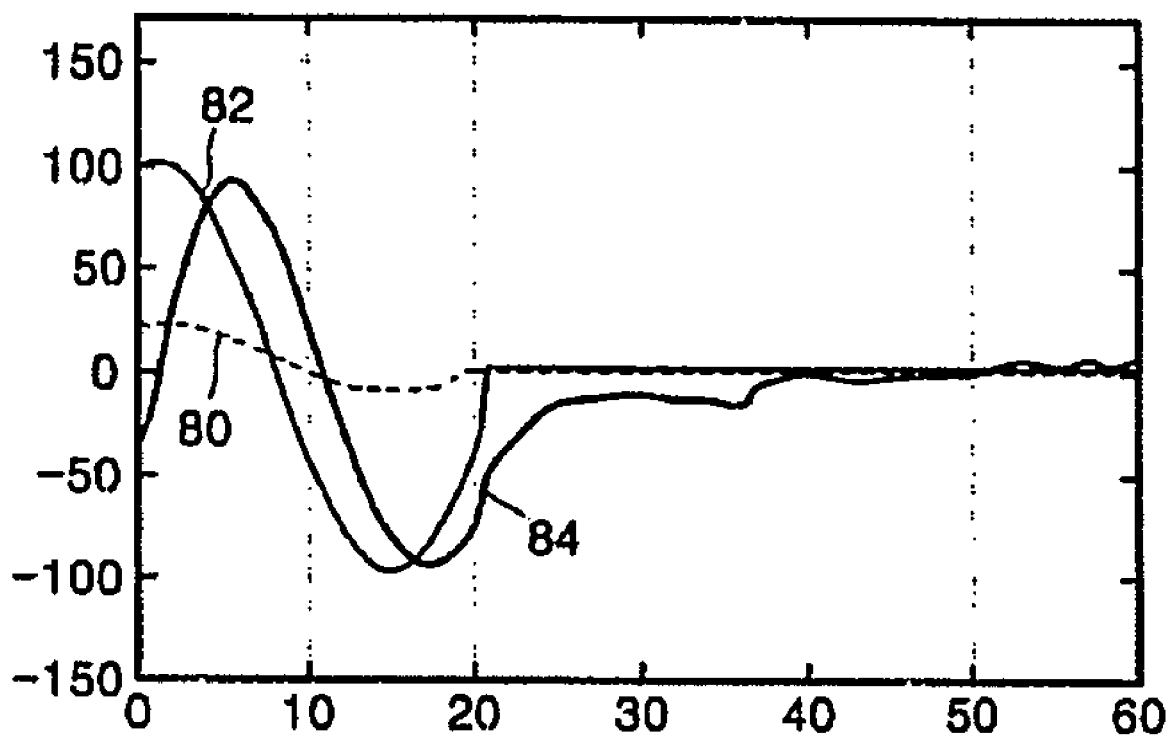
FIG. 8 is a waveform diagram showing the result of performing track seek in discs having a shift according to the present invention.

FIG. 8 is a waveform diagram showing the result of a track seek between discs having a shift according to the present invention. Referring to FIG. 8, a waveform indicated by reference number 80 shows a sine waveform, a waveform indicated by reference number 82 shows a target current profile provided to the servo control system corresponding to the sine waveform 80, and a waveform indicated by reference number 84 shows a final driving current of the voice coil motor provided to the voice coil motor by a servo control system. Compared to the voice coil motor driving current 64 of FIG. 6, it can be seen that a peak does not appear at the end of the track seek in the voice coil motor driving current 84 of FIG. 8.

As a result, the operation of the voice coil motor is stabilized such that no vibration occurs and track seek can be successfully performed.

Figure 9:
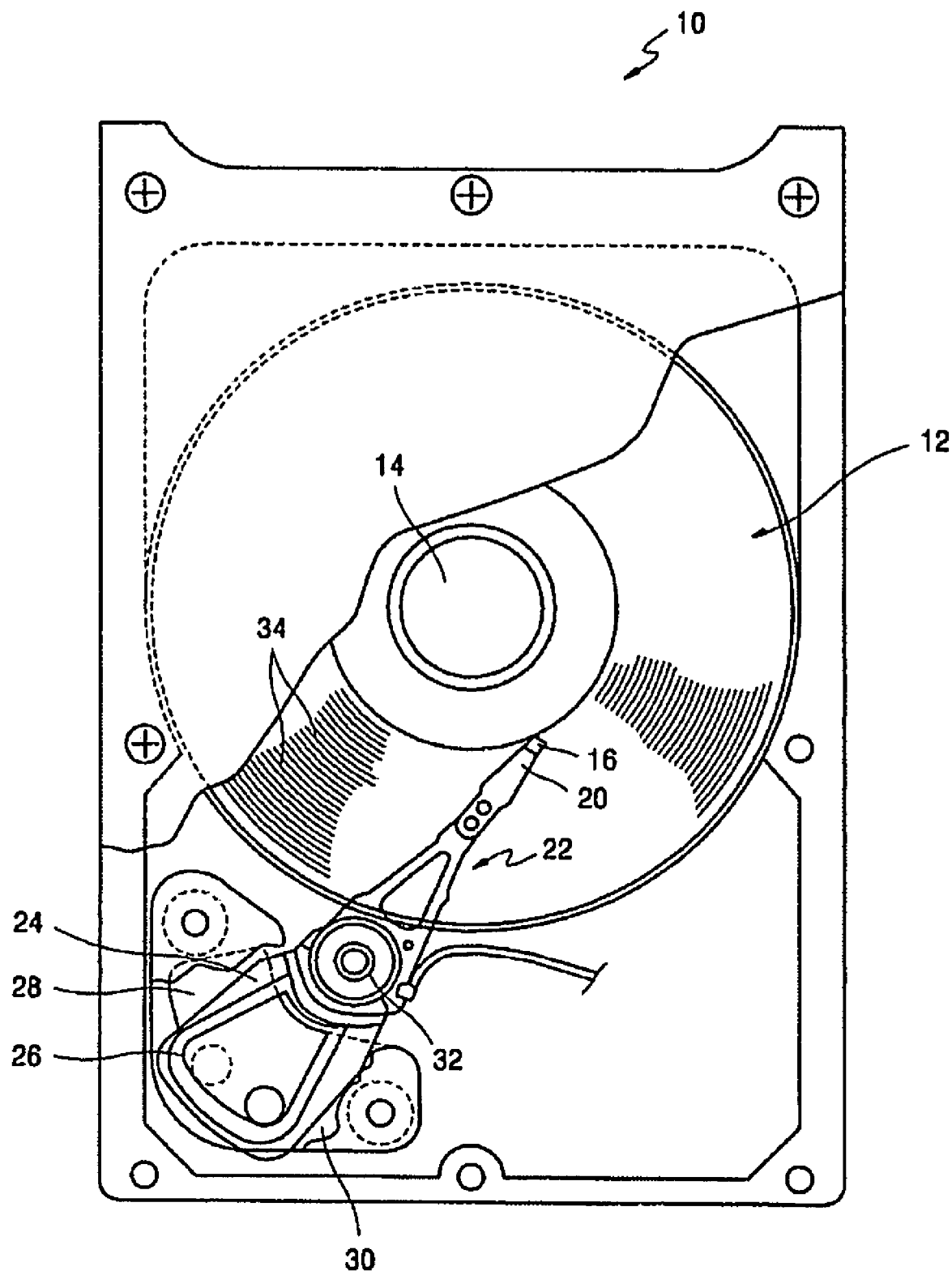
FIG. 9 is a diagram showing the structure of a HDD to which a track seek controlling method according to the present invention is applied.

FIG. 9 is a diagram showing the structure of an HDD to which the track seek controlling method according to the present invention is applied. The HDD shown in FIG. 9 includes at least one disc 12 rotated by a spindle motor 14. The HDD 10 also includes a head 16 positioned close to the surface of a disc 12.

The head 16 can read information from or write information on the rotating disc 12 by sensing a magnetic field of the disc and magnetizing a part. Typically, the head 16 is coupled with the surface of each disc 12. Though the single head 16 is shown, this should be understood as formed with a recording head for magnetizing the disc 12 and a separate reading head sensing the magnetic field of the disc 12.

The reading head is formed with a magneto-resistive (MR) device.

The head 16 can be integrated into a slider 20. The slider 20 has a structure generating an air bearing between the head 16 and the surface of the disc 12. The slider 20 is coupled with a HGA 22. The HGA is attached to an actuator arm 24 having a voice coil 26. The voice coil 26 is disposed close to a magnetic assembly 28 determining a voice coil motor (VCM) 30. A current provided to the voice coil 26 generates torque rotating the actuator arm 24 about the bearing assembly 32. The rotation of the actuator arm 24 moves the head 16 across the surface of the disc 12.

Typically, information is stored in a circular track of the disc 12. Each track generally includes a plurality of sectors. Each sector includes a data field and an identification field. The identification field is formed with a gray code identifying a sector and a track (cylinder). The head 16 moves across the surface of the disc 12 in order to read information from or to record information.

Figure 10:
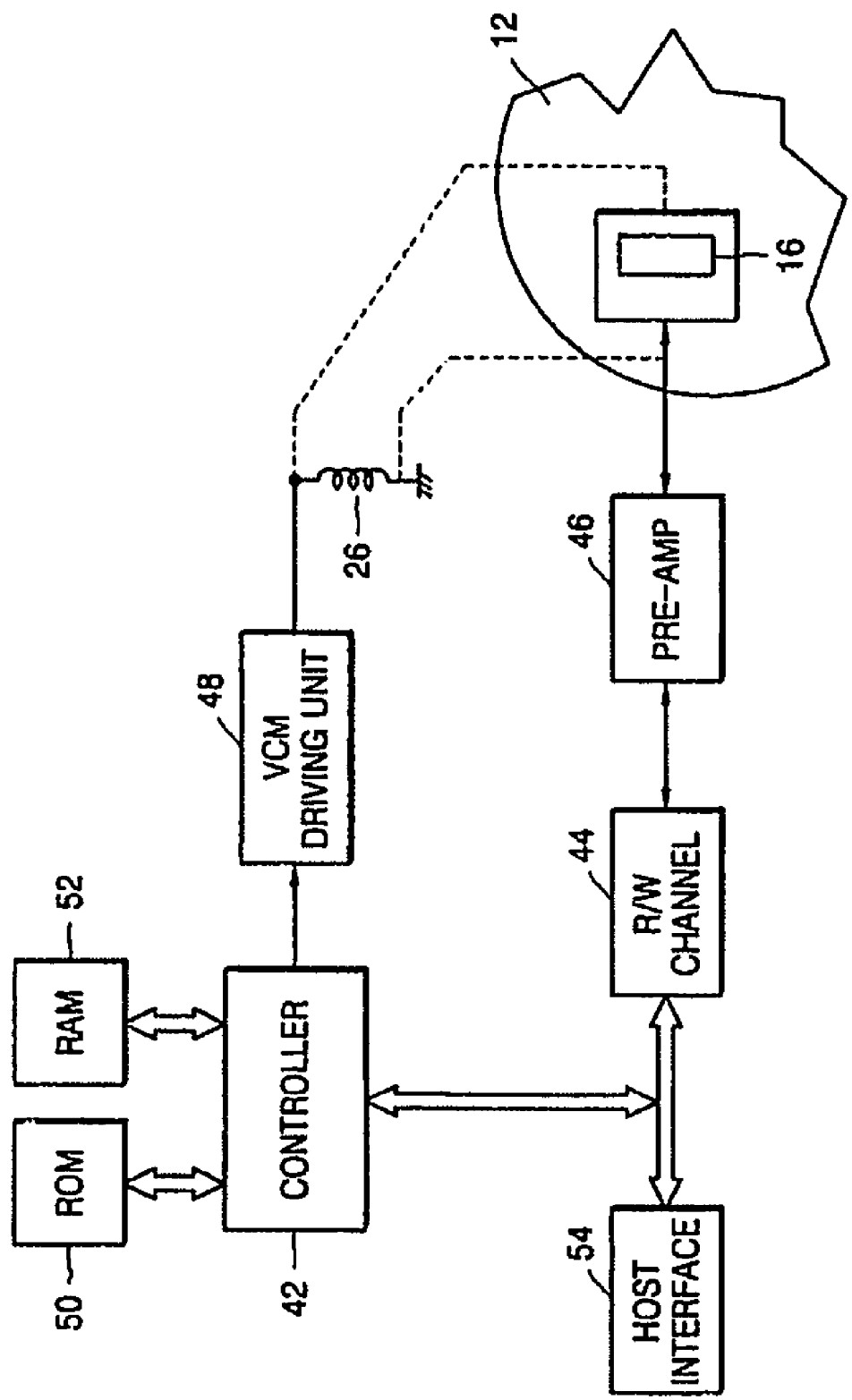
FIG. 10 is an electric system capable of controlling the HDD shown in FIG. 9.

FIG. 10 is an electric system capable of controlling the HDD shown in FIG. 9. The electric system 10 shown in FIG. 10 includes a controller 42 coupled to the head 16 by a read/write (R/W) channel circuit 44 and a pre-amp circuit 46. The controller 42 can be a digital signal processor (DSP), a microprocessor, or a microcontroller. The controller 42 provides a control signal to the R/W channel 44 in order to read information from or write information on the disc 12. Typically, information is transmitted from the R/W channel to a host interface circuit 54. The host interface circuit 54 includes a buffer memory and a control circuit for interfacing with a system such as a personal computer.

The controller 42 is also connected to a VCM driving circuit 48 providing a driving current to the voice coil 26. The controller 42 provides a control signal to the driving circuit 48 in order to control the excitation of the VCM and the motion of the head 16.

The controller 42 is coupled with a non-volatile memory such as a ROM, a flash memory and/or a RAM device. The memory devices 50 and 52 store commands and data used by the controller 42 in order to execute a software routine. As one of software routines, there is a seek control routine to move the head 16 from one track to another track. As an embodiment, execution codes to perform the seek control method according to the present invention described above with reference to FIG. 9 are stored in the memory device 50.

In performing track seek, the controller 42 moves the head 16 from one track to another track according to control of the seek control routine. In particular, when the track seek includes disc switching, the controller 42 switches head to other head corresponding to a disc having a target track. Then, by comparing the target track address of the previous seek operation with the target track address of the current track seek operation, track seek length is obtained. If the track seek length is shorter than the predetermined limit seek length, the track address of a track in which the head is positioned on the switched disc is read. By referring to the read track address and the target track address, track seek length and a seek profile thereof are determined and according to the determined seek profile, track seek is performed. Here, the predetermined limit seek length is determined by considering the shift in a possible range of the disc.

The present invention can be embodied as a method, an apparatus, and a system. When it is embodied as software, elements of the present invention are code segments executing essential functions. Programs or code segments can be stored in a processor readable recording medium, or can be transmitted in a computer data signal coupled with a carrier in a transmission medium or communication networks. The processor readable medium is any medium that can store or transmit information. Examples of the processor readable medium include electronic circuits, semiconductor memory devices, read-only memory (ROM), random-access memory (RAM), flash memory, EEPROM, floppy discs, optical data storage devices, hard discs, optical fiber media, and radio frequency (RF) network. Computer data signals include any signal that can be transmitted through electronic network channels, optical fiber, air, electromagnetic field, and RF networks.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the track seek control method of the present invention as described above, even when there is a shift between discs, the shift is automatically reflected and compensated for when track seek is performed, such that stable track seek can be performed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling track seek in a hard disc drive (HDD), including disc switching, comprising:
   switching a head to a disc having a target track;
   calculating track seek length by comparing the previous target track address and the current target track address;
   determining whether the track seek length is shorter than the limit seek length set by considering a shift of a disc;
   reading the track address of a track on which the head is put on the switched disc if the track seek length is shorter than the limit seek length, and, determining track seek length and a seek profile based on the read track address and the target track address; and
   performing track seek based on the determined seek profile.

2. The method of claim 1, further comprising:
   determining a seek profile based on the track seek length if the track seek length is longer than the limit seek length; and
   performing track seek based on the determined seek profile.

3. The method of claim 1, wherein the track address is read from a servo sample.

4. A computer having an HDD of the method of claim 1;
   wherein the HDD comprising;
   a disc to store predetermined information;
   a spindle motor to rotate the disc;
   a head recording information on the disc and reading information from the disc;
   a voice coil motor (VCM) driver to drive a voice coil motor (VCM) to move the head across the surface of the disc; and
   a controller to generate a current driving the VCM.

5. A computer readable magnetic or optical recoding medium having embodied thereon a computer program for executing a method of controlling track seek in a HDD, including disc switching, wherein the method comprises:
   switching a first head to a second head corresponding to a disc having a target track;
   calculating track seek length by comparing the previous target track address and the current target track address;
   determining whether the track seek length is shorter than the limit seek length set by considering a shift of a disc;
   reading the track address of a track on which the head is put on the switched disc if the track seek length is shorter than the limit seek length, and by, determining track seek length and a seek profile based on the read track address and the target track address; and
   performing track seek based on the determined seek profile.

6. A hard disc drive (HDD) comprising:
a disc storing predetermined information;
a spindle motor rotating the disc;
a head recording information on the disc and reading information from the disc;
a voice coil motor (VCM) driver driving a voice coil motor (VCM) moving the head across the surface of the disc; and
a controller generating a current driving the VCM so that the head is moved along a sine wave acceleration trajectory corresponding to track seek length,
wherein the controller switches a first head to a second head corresponding to a disc having a target track; calculates track seek length by comparing the previous target track address and the current target track address; determines whether the track seek length is shorter than the limit seek length set by considering a shift of a disc; reads the track address of a track on which the head is put on the switched disc if the track seek length is shorter than the limit seek length, and determines the track seek length and a seek profile by referring to the read track address and the target track address; and performs track seek according to the determined seek profile.

7. The HDD of claim 6, further comprising:
a memory device to store commands and data used by the controller.

8. The HOD of claim 7, wherein the memory device is Read Only Memory (ROM).

* * * * *

UNITED STATES PATENT AND TRADEMARK OFFICE
CERTIFICATE OF CORRECTION

PATENT NO. : 7,463,445 B2  Page 1 of 1
APPLICATION NO. : 11/324488
DATED : December 9, 2008
INVENTOR(S) : Jung-ho Lee It is certified that error appears in the above-identified patent and that said Letters Patent is hereby corrected as shown below:

Column 8, Line 41, change "comprising;" to --comprising:--.

Column 8, Line 51, change "recoding" to --recording--.

Column 10, Line 12, change "HOD" to --HDD--.

Signed and Sealed this

Seventeenth Day of March, 2009

JOHN DOLL
*Acting Director of the United States Patent and Trademark Office*